United States Patent [19]
Jarocki et al.

[11] Patent Number: 5,478,116
[45] Date of Patent: Dec. 26, 1995

[54] D-RING MOUNTING ASSEMBLY

[75] Inventors: Corey J. Jarocki, Harrison Township; Francis Wickenheiser, Monroe; John T. Pustell, Ann Arbor; Edward J. Corpe, Grosse Ile; Jeffrey D. Elliott, Sterling Heights, all of Mich.

[73] Assignee: Ford Motor Company, Dearborn, Mich.

[21] Appl. No.: 272,367

[22] Filed: Jul. 8, 1994

[51] Int. Cl.⁶ .................................................. B60R 22/24
[52] U.S. Cl. .................................................. 280/808
[58] Field of Search ........................... 280/801.1, 808; 297/483; 296/64, 69

[56] References Cited

U.S. PATENT DOCUMENTS

| | | |
|---|---|---|
| 3,147,995 | 9/1964 | Bohlin . |
| 3,743,046 | 7/1973 | Rothschild . |
| 3,845,524 | 11/1974 | Hull et al. . |
| 3,857,581 | 12/1974 | Kaneko et al. . |
| 4,541,654 | 9/1985 | Jonasson .................. 280/801.1 |
| 4,548,425 | 10/1985 | Evans ........................ 280/808 |
| 4,770,459 | 9/1988 | Nakaiwa et al. . |
| 4,915,451 | 4/1990 | Forget et al. ............. 280/801.1 |
| 5,020,856 | 6/1991 | George . |

FOREIGN PATENT DOCUMENTS

| | | | |
|---|---|---|---|
| 2354108 | 4/1975 | Germany ................. 280/801.1 |
| 2743209 | 4/1979 | Germany ................. 280/801.1 |
| 149728 | 7/1985 | Germany ................. 280/801.1 |
| 61-139541 | 6/1986 | Japan ........................ 280/808 |
| WO92/11162 | 7/1992 | WIPO ....................... 280/801.1 |

*Primary Examiner*—Karin Tyson
*Attorney, Agent, or Firm*—Daniel M. Stock; Roger L. May

[57] ABSTRACT

An occupant restraint system for an automotive vehicle of the type including multiple longitudinally spaced seating positions in which seats are arranged in back-to-back relationship includes a guide ring assembly having two D-rings mounted on a common double threaded bolt on a vertical body pillar that is in longitudinal registration with the backs of a pair of back-to-back seats. The double ended bolt construction permits assembly of one of the D-rings to the pillar independent of the other during vehicle assembly.

13 Claims, 2 Drawing Sheets

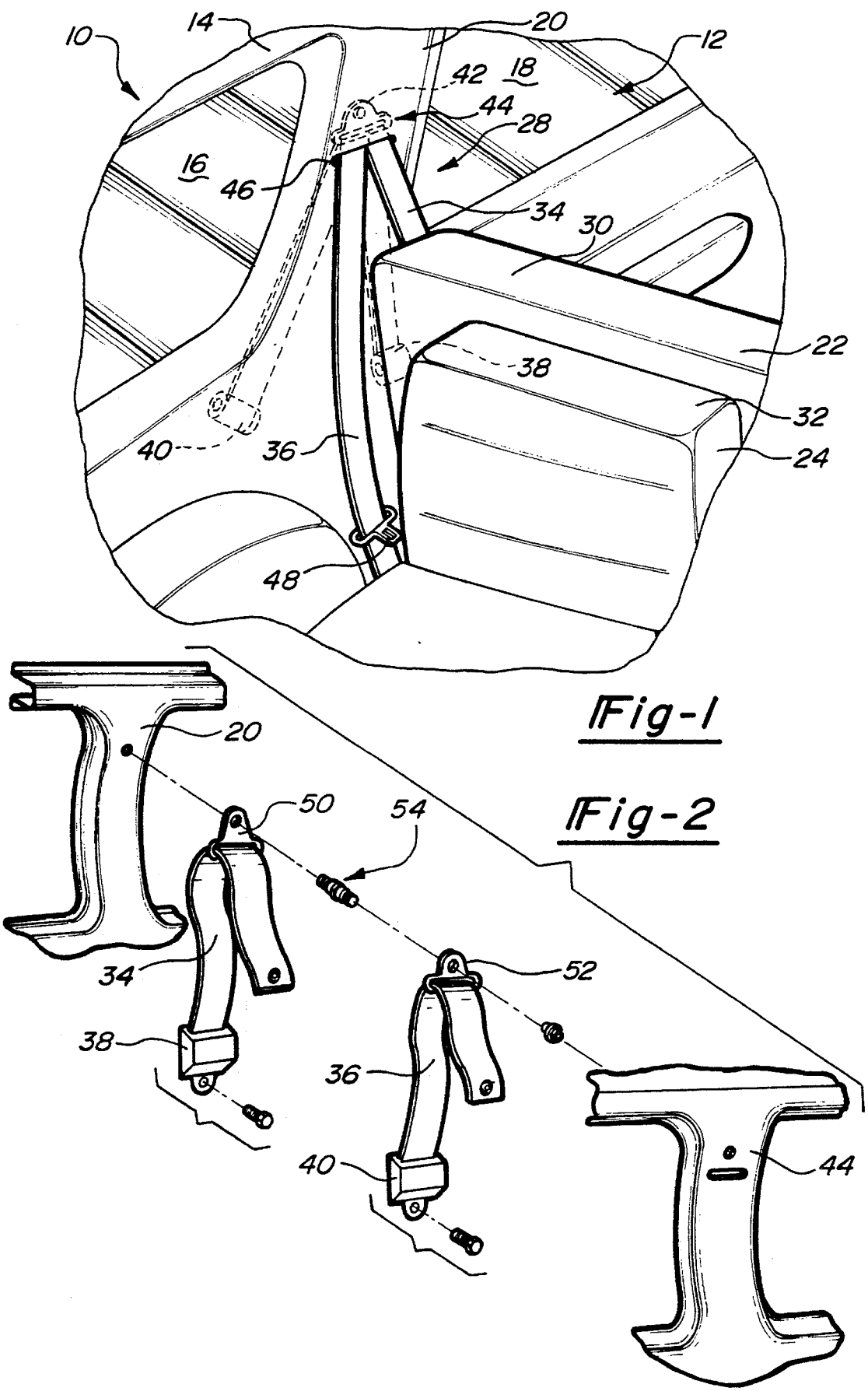

D-RING MOUNTING ASSEMBLY

BACKGROUND OF THE INVENTION

1. Technical Field

The invention relates generally to occupant restraint systems for automotive vehicles, and more particularly to a mounting assembly for restraint systems for automotive vehicles employing back-to-back seating arrangements.

2. Description of the Prior Art

It is legislatively mandated in certain jurisdictions that occupant restraint devices, typically combination lap and shoulder belt arrangements, be provided for each laterally outboard seating position in an automotive vehicle. For vehicles like station wagons, passenger vans, and sport/utility vehicles, which may have more than two longitudinally spaced seating positions, this mandate has resulted in the provision of occupant restraint systems which add significant weight and cost to the manufacture of such vehicles, and which may be mounted in ways viewed as aesthetically unpleasing.

One particularly advantageous solution to the problems of the prior art is that defined in U.S. Ser. No. 08/172,798, assigned to the assignee of the present invention, in which seatbelts deployed with respect to oppositely facing seats are mounted on an intermediate pillar through agency of a single bolt. It has been found, however, that in certain applications, the mounting arrangement is not readily adaptable to certain vehicle designs in that it does not provide flexibility for sequencing the operation of assembly of the seatbelt components in all manners that may be deemed efficient in the assembly plant.

In the embodiment disclosed in the previously mentioned '798 patent application, both of the D-rings which guide the seatbelt webbing of the two seatbelt systems must be assembled together with the single bolt being operative to fix the two belts to the vehicle body. In some applications, it is disadvantageous to provide access to the fastener in the sheetmetal, for example, by leaving a portion untrimmed, until assembly of both the D-rings simultaneously is required.

SUMMARY OF THE INVENTION

Responsive to deficiencies in the related art and practice, it is an object of the present invention to provide an occupant restraint system for an automotive vehicle having multiple longitudinally displaced occupant seating positions which provide increased flexibility in sequencing assembly of the mounting arrangement.

Such an occupant restraint system is provided for a vehicle of the type that includes a pair of seats carried in the vehicle in back-to-back relationship with the backs of the seats in longitudinal registration with a pillar of the vehicle and in which a pair of D-rings, one each for the front and the rear of the two seats, are mounted for pivotal movement on the vehicle pillar through a double-threaded shoulder bolt received in the vehicle body on one end and captured by a nut on the other end.

BRIEF DESCRIPTION OF THE DRAWINGS

Other objects and features of the present invention will be apparent to those skilled in the automotive vehicle body arts upon reading the following description with reference to the accompanying drawing, in which:

FIG. 1 is a partial perspective view of the interior of an automotive vehicle embodying the occupant restraint system of the present invention;

FIG. 2 is an exploded view of the improved mounting arrangement for D-ring assembly of the occupant restraint system of the present invention;

DESCRIPTION OF THE PREFERRED EMBODIMENT

Figure 3:
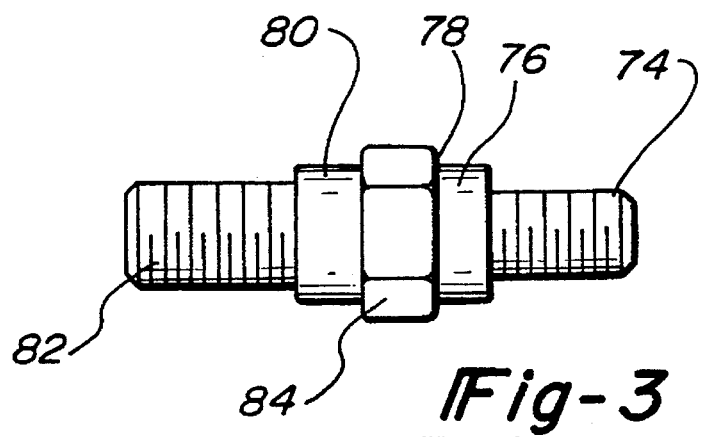
FIG. 3 is an elevational view of the double-threaded shoulder bolt.

Turning now to the drawing, and in particular to FIG. 1 thereof, an automotive vehicle 10 is illustrated as having a passenger compartment 12 bounded on its sides by vehicle sidewalls 14 (one shown) through which are formed apertures for windows 16, 18, illustrated as being separated by a generally vertically extending body pillar 20 for support of the vehicle roof (not shown).

The vehicle 10 is illustrated as being of the type of vehicle employing a plurality of longitudinally spaced seating positions. Specifically, the vehicle 10, represented in FIG. 1, is a station wagon type vehicle which includes a front seat 22 and a rear seat 24 arranged in back-to-back relationship, the rear seat 24 being narrower than the front seat 22 to accommodate positioning within a rear wheel house portion 26 of vehicle 10. it is to be understood that the vehicle 10 illustrated is intended to represent a station wagon in which another seating position is provided forward of the seat 22.

Occupant seats 22, 24 are provided with an occupant restraint system, indicated generally at 28. It should be noted that the seat back 30 of the front seat 22 and the seat back 32 of the rear seat 24 are positioned in approximate longitudinal registration with the pillar 20. This convenient placement contributes to the appropriate configuration of the occupant restraint system 28.

The occupant restraint system 28 further includes a front seatbelt 34 and a rear seatbelt 36. Each of the seatbelts 34, 36 is arranged as a continuous loop seatbelt system in which a retractor 38, 40 is mounted in a known manner on the body of the vehicle 10 for controlling protraction and retraction of the belts 34, 36. The ends of each of the belts 34, 36 opposite the retractors 38, 40 are anchored to another portion of the vehicle body, typically the floor (not shown). Each belt 34, 36 is threaded through a guide assembly, indicated generally at 42, which is mounted on the pillar 20 and covered by a trim panel 44 having a slot 46 formed therein for passage of the belts 34, 36. A buckle tongue 48 (one shown) is carried on each of the belts 34, 36 for engagement with a buckle (not shown) carried on the inboard side of the seating position in each of the seats 22, 24.

Because of the variation in longitudinal position of the occupant seating positions for the seats 22, 24, respectively, and because of the variation and seated height and girths of various vehicle occupants, it is important that relative non-interfering movement of the courses of the belts 34, 36, as they pass through the guide assembly 42, be provided. This is accomplished in the occupant restraint system of the present invention in part through provision of the illustrated guide ring assembly 42, which may best be seen in FIGS. 2 and 4.

The guide ring assembly 42 is illustrated as including a front D-ring 50, a rear D-ring 52, a mounting bolt 54, and an antifriction spacers 56, 57. The front D-ring 50 is illustrated as comprising a flat plate having a mounting boss portion 58 pierced by a central bore 60 and a depending guide portion 62 having an elongated slot 64 formed therethrough for receiving the seatbelt 34. The rear D-ring 52 likewise is illustrated as including a mounting boss 66 through which is formed a through-bore 68 and a depending guide portion 70 through which is formed an elongated slot 72 for receiving the belt 36.

The mounting bolt 54 is illustrated as being of a stepped diameter design having threaded portion 74 that extends axially to a first mounting diameter 76 terminating at a shoulder 78. It also has an enlarged mounting diameter 80, and includes a second, larger diameter threaded portion 82 and a driving surface such as the hexagonal form indicated at 84.

In assembling the guide ring assembly 42 to the pillar 20, the mounting bolt 54 is inserted through the D-rings 50, 52 into threaded engagement with a reinforcing portion, which may be a weld nut 85 carried in the vehicle body pillar 20. The first mounting diameter 76 supports the front D-ring 50 for pivotal movement with respect to the mounting bolt 54. The second enlarged mounting diameter 80 of the bolt 54 supports the rear D-ring 52 at its through-bore 68 for pivotal movement with respect to the mounting bolt 54 and hence the pillar 20. Also mounted on the enlarged diameters 76, 80 are antifriction spacers 56, 57 which facilitate movement of the D-rings about the bolt 54.

Figure 4:
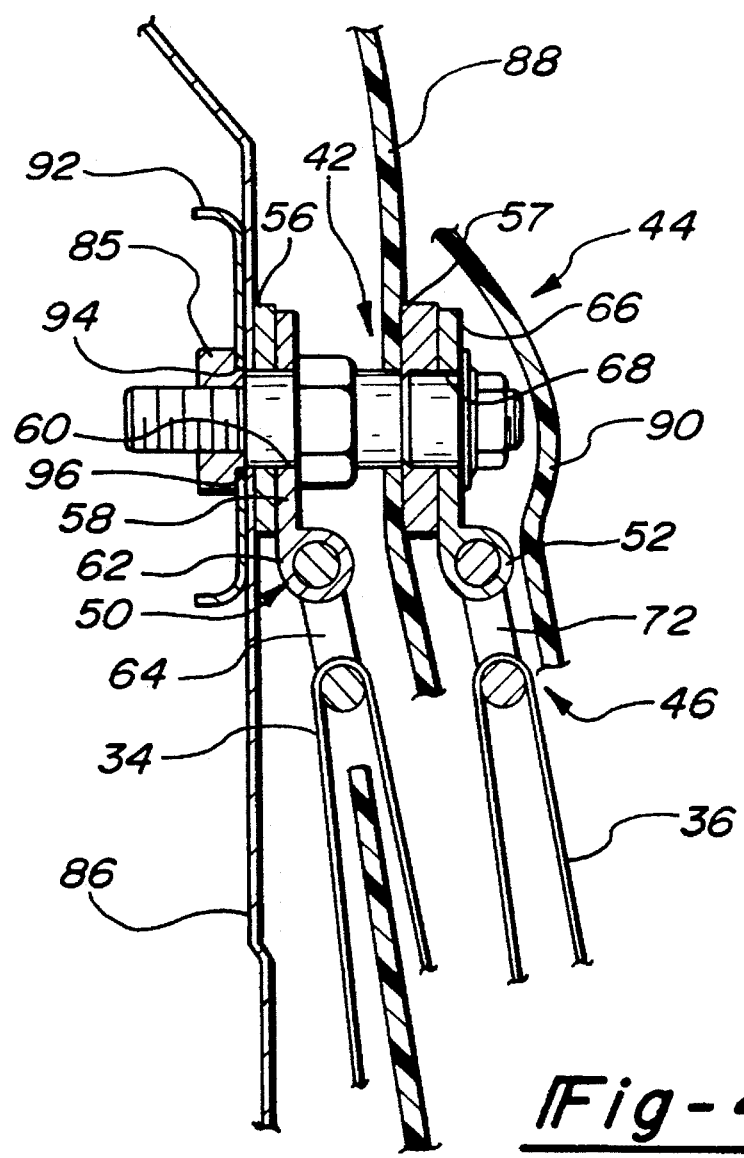
FIG. 4 is a cross-sectional view of the mounting arrangement to the occupant restraint system of the present invention.

The advantages of the mounting arrangement of the present invention may best be appreciated by reference to FIGS. 2 and 5. The pillar, indicated at 20, is illustrated in FIG. 4 as including a sheetmetal panel 86 that in its final assembled position is covered by a trim panel 88 which may include a bolt covering portion 90, as shown in FIG. 4. A local reinforcement 92 is carried on the sheetmetal panel and it includes a central aperture 94 through which a reduced diameter portion 96 of the weld nut 85 is placed. The nut 85, the sheetmetal panel 86, and the reinforcement 92 are secured together in fixed relationship by welding. This construction provides flexibility in the assembly of the seatbelt system 28. It permits assembly of the front D-ring 50 onto the pillar 20 by engaging reduced Giameter threaded portion 74 threadedly within the weld nut 85 to capture the antifriction spacer 56 and the D-ring 50. Subsequently, the rear D-ring 52 and its associated antifriction spacer 57 may be assembled on the bolt 54 with the nut 96 threadedly engaging the threaded portion 82. This may be done through arrangement against an outside surface 98 of the trim panel 88 within the auxiliary trim panel 90, as shown in FIG. 4. Alternatively, the entire assembly may be carried within trim panels. Provision may be made as shown in FIG. 2 for inserting the nut 96 through portions of the trim. This gives freedom in the sequencing of assembly operations. The advantage is provided by the lack of need to assemble both the front D-ring 50 and the rear D-ring 52 at the same time.

While only one embodiment of the present invention of the present invention has been shown, others may occur to those skilled in the automotive vehicle body arts which do not depart from the scope of the following claims.

What is claimed is:

1. An occupant restraint system for an automotive vehicle, comprising:

a vertically extending vehicle body pillar;

a pair of longitudinally spaced seats carried in the vehicle in back-to-back relationship, a front seat facing forwardly and a rear seat facing rearwardly, the backs of the seats being positioned in longitudinal registration with the pillar;

a front seatbelt;

a rear seatbelt;

a front retractor mounted on the vehicle adjacent the front seat and operative to control protractive and retractive movement of the front seatbelt;

a rear retractor mounted on the vehicle and operative to control protractive and retractive movement of the rear seatbelt;

a front D-ring having an elongated slot for guiding and receiving the front seatbelt from the front retractor and guiding the seatbelt toward the front seat;

a rear D-ring having an elongated slot for guiding and receiving the rear seatbelt from the rear retractor and guiding the rear seatbelt toward the rear seat;

mounting means for mounting both the front and rear D-rings on the vehicle body pillar for pivotal movement with respect thereto; and means operatively carried with the mounting means for permitting mounting of one of the front and rear D-rings to the pillar without so mounting the other.

2. An occupant restraint system as defined in claim 1 wherein the mounting bolt means comprises a double threaded bolt fixedly secured to the pillar and pivotally supporting each of the D-rings.

3. An occupant restraint system as defined in claim 2 wherein the bolt comprises threaded portions formed on each end.

4. An occupant restraint system as defined in claim 2 and further comprising a pair of nuts threadedly engaging the threaded portions of the bolt.

5. An occupant restraint system as defined in claim 2 wherein one of the nuts is fixedly secured to the pillar.

6. An occupant restraint system as defined in claim 5 wherein the one nut is a weldnut.

7. An occupant restraint system as defined in claim 2 wherein the D-rings are carried in axially spaced relationship on the bolt.

8. An occupant restraint system as defined in claim 1 wherein the pillar includes an inner trim cover facing the seats and wherein the other nut of the pair of nuts is insertable through portions of the trim cover.

9. An occupant restraint system for an automotive vehicle, comprising:

a vertically extending vehicle body pillar;

a pair of longitudinally spaced seats carried in the vehicle in back-to-back relationship, a front seat facing forwardly and a rear seat facing rearwardly, the backs of the seats being positioned in longitudinal registration with the pillar;

a front seatbelt;

a rear seatbelt;

a front retractor mounted on the vehicle adjacent the front seat and operative to control protractive and retractive movement of the front seatbelt;

a rear retractor mounted on the vehicle and operative to control protractive and retractive movement of the rear seatbelt;

a front D-ring having an elongated slot for guiding and receiving the front seatbelt from the front retractor and guiding the seatbelt toward the front seat;

a rear D-ring having an elongated slot for guiding and receiving the rear seatbelt from the rear retractor and guiding the rear seatbelt toward the rear seat;

a first nut fixedly secured to the pillar; and a single bolt threadedly engaged with the pillar nut and pivotally supporting both of the D-rings, the bolt being an elongate member having a first threaded portion formed at one end thereof engaging the pillar nut and a second threaded portion formed at the other end thereof; and a second nut engaging the second threaded portion to secure the D-rings on the bolt.

10. An occupant restraint system as defined in claim 9 wherein the bolt is a multiple shoulder bolt having a smaller diameter portion for pivotally mounting one of the D-rings and a larger diameter portion for mounting the other.

11. An occupant restraint system as defined in claim 10 wherein the first and second thread portions are of unequal diameter.

12. An occupant restraint system as defined in claim 9 wherein the D-rings are carried in axially spaced relationship on the bolt.

13. An occupant restraint system as defined in claim 8 wherein the pillar includes an inner trim cover facing the seats and wherein the second nut is insertable through portions of the trim cover.

* * * * *